Dec. 20, 1949     C. C. WHITTAKER     2,492,023

CONTROL SYSTEM FOR OPERATING TROLLEY FROGS

Filed Jan. 19, 1945

WITNESSES:
E. A. M?Closky
F. V. Giolma

INVENTOR
Charles C. Whittaker.
BY G. M. Crawford
ATTORNEY

Patented Dec. 20, 1949

2,492,023

UNITED STATES PATENT OFFICE 2,492,023

CONTROL SYSTEM FOR OPERATING TROLLEY FROGS

Charles C. Whittaker, Pittsburgh, Pa., assignor to Westinghouse Electric Corporation, East Pittsburgh, Pa., a corporation of Pennsylvania Application January 19, 1945, Serial No. 573,564

7 Claims. (Cl. 191—38)

My invention relates, generally, to control apparatus and systems, and it relates, in particular, to control apparatus and systems for trolley conductor systems.

Generally stated, it is an object of my invention to provide an improved control system for operated trolley frogs which is simple and inexpensive to manufacture and is positive and reliable in operation.

More specifically, it is an object of my invention to provide for selectively controlling the operation of a switch device in a trolley system from an electrically operated vehicle without requiring engagement between means on the vehicle and stationary control means.

An important object of my invention is to provide for magnetically controlling the operation of a trolley conductor switch by magnetically coupling control means on a current collector of a vehicle with stationary control means in the overhead conductor system.

Another object of my invention is to provide for operating a control device for a trolley frog in a trolley conductor system by means of a magnetic shunt positioned on a vehicle.

Yet another object of my invention is to provide for operating a stationary control device positioned adjacent a trolley conductor by means of a shunt of magnetic material positioned on a current collector traversing the conductor.

Still another object of my invention is to provide for operating a control device positioned adjacent a trolley conductor by controlling the reluctance of the magnetic circuit of the device by magnetic shunt means on the current collector of an electrically operated vehicle.

A further object of my invention is to provide for operating a stationary control device by means of flux linkages with magnetic means on a current collector of a moving vehicle.

Other objects will, in part, be obvious and will, in part, be explained hereinafter.

In accordance with one embodiment of my invention, a pair of trolley frogs at an intersection between main and branch conductors in a trolley conductor system may be controlled by control devices in the form of permanent magnet members positioned in each of the main conductors in advance of, or on the leading side of, the intersection. These permanent magnet members have a movable armature at one end thereof and have their other ends positioned adjacent the main conductors so that the air gap therebetween may be changed by means of flux linkages by the use of a magnetic shunt on the current collectors of an electrically operated vehicle. Depending on whether or not the vehicle is turning as it enters the intersection, the current collectors will be so positioned that one is in advance of the other or they will be approximately in side-by-side relation. Accordingly, the control device will be operated one ahead of the other or substantially simultaneously. The operation of the trolley frogs is controlled by a control relay selectively operable to different positions depending on the order of operation of the control devices, so as to direct the current collectors either to the branch conductors or along the main conductors. Holding means are provided for retaining the control devices in the operated position until the current collectors have passed the intersection, whereupon they may be released due to the operation of additional control devices positioned adjacent the main and branch conductors on the trailing side of the intersection.

For a more complete understanding of the nature and scope of my invention, reference may be made to the following detailed description which may be studied in connection with the accompanying drawing, in which.

Figure 1:
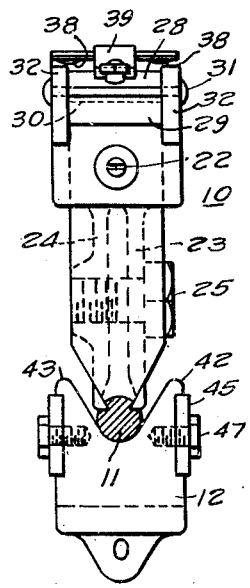
Figure 1 is an enlarged end elevational view of a control device embodying my invention in one of its forms.
Figure 2:
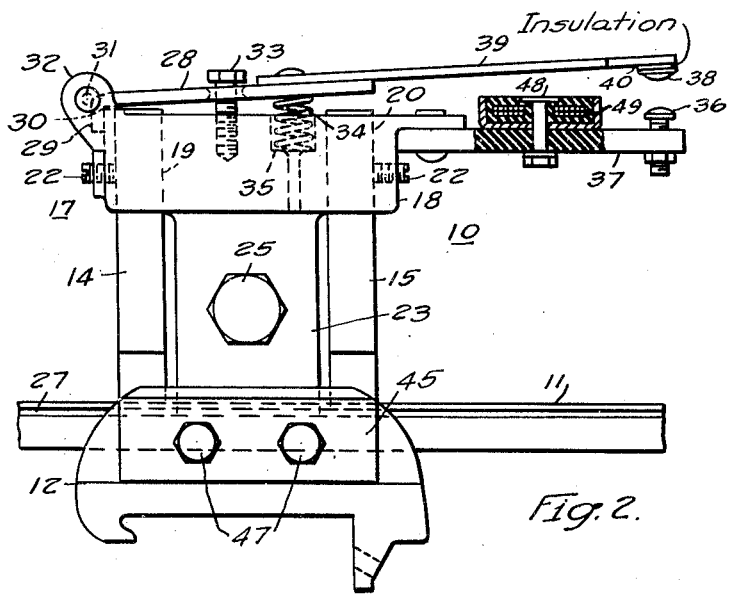
Fig. 2 is an enlarged side elevational view of the control device.

Referring to Figs. 1 and 2, the reference numeral 10 may denote, generally, a control device disposed to be positioned adjacent a trolley conductor 11 for operation in response to the passage thereby of a current collector shoe 12 of an electrically operated vehicle without any engagement thereof with any portion of the vehicle.

The control device 10 may, for example, comprise an electromagnetic circuit or, as shown, a pair of magnetic core members 14 and 15. These core members may be permanent magnets of cobalt steel or an aluminum nickel steel having a high retentivity.

The core members 14 and 15 may be positioned relative to the trolley conductor 11 by support means 17 comprising a body portion 18 having spaced openings 19 and 20 therein for receiving the upper ends of the core members 14 and 15. Setscrews 22 may be provided for securing the core members in the body portion. With a view to positioning the core members with the lower tapered ends thereof either on or closely adjacent to the trolley conductor 11, the body portion 18 may be provided with clamp means in the form of spaced dependent clamp ears 23 and 24 having means such as the bolt 25 for drawing them together so that the lower ends thereof may be positioned in the grooves 27 of the trolley conductor 11 and grip the upper portion of the conductor. In the event that the trolley device is used with a round trolley conductor, the lower ends of the clamp ears 23 and 24 may be suitably shaped to grip the round conductor and thereby support the trolley device relative thereto.

The control device 10 is also provided with an armature 28 pivotally mounted on the body portion 18 in any suitable manner, having, for example, an angularly related end portion 29 which may be retained in predetermined relation to the edge 30 of the body portion 18 by means of a transverse pin 31 extending between the ears 32 at one end of the body portion. Suitable stop means may be provided, such as the setscrew 33, which may pass through an opening in the armature and be threaded into the body portion 18, for positioning the armature in predetermined spaced relation to the upper ends of the permanent magnet core members 14 and 15. A spring 34 may be provided intermediate the body portion 18 and the armature in a well 35 for normally retaining the armature in spaced relation to the ends of the core members 14 and 15.

In order to provide for controlling an associated electrical control circuit, a pair of stationary contact members 36 may be supported in spaced relation adjacent the body portion 18 by means of an insulating support member 37. A contact member 38 may be provided on the armature 28 for bridging the stationary contact members 36. The bridging contact member 38 may be mounted on an extension 39 of the armature and insulated therefrom by means of suitable insulation 40.

In order to actuate the armature 28, magnetic shunt means may be provided in association with the current collector 12. Where the current collector is made of a magnetic material, the upwardly extending flange portions 42 and 43 of the collector shoe 12 may be used to shunt the lower ends of the magnetic core members 14 and 15 so as to provide a sufficient concentration of magnetic flux in the air gap between the upper ends of the core members and the armature 28 to actuate the armature. In the event that the current collector shoe 12 comprises a non-magnetic material, such as aluminum, bronze, or any of the numerous alloy combinations of these materials, separate magnetic shunt means may be provided thereon such as the shunt members 45 which may be in the form of plates of a suitable magnetic material secured to the current collector on either side thereof by means of screws 47. If desired, the shunt members 45 may in some instances comprise permanent magnet members.

In order to provide for retaining the armature 28 in the operated position for a predetermined interval of time after the passage of a current collector shoe, suitable holding means may be provided. For example, the extension 39 on which the bridging contact member 38 is mounted may be made of a magnetic material or provided with a suitable holding member of magnetic material attached thereto. A holding winding 49 may be mounted adjacent the body portion 18, being, for example, secured to the insulating support 37 by a bolt 48 of magnetic material so as to provide for retaining the armature 28 in the operated position after the contact members 36 and 38 have been brought into engagement, so long as the winding 49 is energized.

Figure 3:
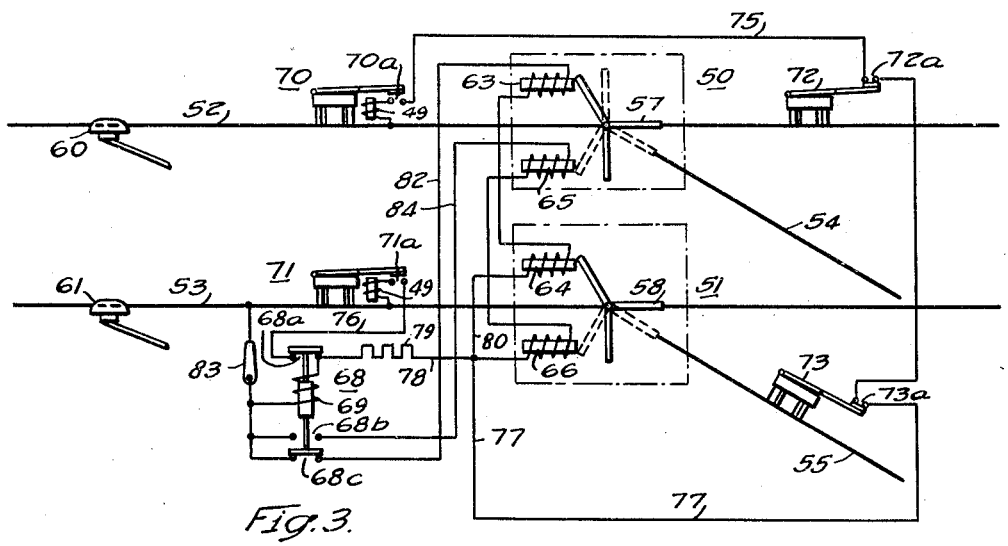
Fig. 3 is a diagrammatic view of a trolley frog control system embodying the invention in one of its forms.

Referring to Fig. 3, the reference numerals 50 and 51 may denote, generally, electrically operated trolley frogs positioned at the intersections between the main conductors 52 and 53 and the associated branch conductors 54 and 55, respectively, of a trolley conductor system. The trolley frogs 50 and 51 may be of any suitable construction comprising, for example, movable tongue members 57 and 58 disposed to be positioned for directing the current collectors 60 and 61 of an electrically operated vehicle (not shown) either along the main conductors or onto the branch conductors by means of "straight" operating windings 63 and 64, and "turn" operating windings 65 and 66, respectively. A control relay 68 having an operating winding 69 may be provided for selectively controlling the energization of the "straight" and "turn" operating windings.

In order to control the operation of the control relay 68 in response to different relative longitudinal positioning of the current collector shoes caused by different predetermined angular relations of the electrically operated vehicle relative to the main conductors 52 and 53 as it approaches the intersection, control devices 70 and 71 of the nature described in connection with Figs. 1 and 2, may be positioned in substantially opposed relation on the main conductors in advance of, or on the leading side of the intersection. For the purpose of maintaining the control devices 70 and 71 in the operated position until the current collectors 60 and 61 have passed through the intersection of the main and branch conductors, additional control devices 72 and 73 may be positioned adjacent one of each of the main and branch conductors on the trailing side of the intersection for interrupting the energization of the holding windings 49 of the control devices 70 and 71.

With the current collectors 60 and 61, as shown, in substantially the same relative positions longitudinally of the conductors as they approach the intersection, the control devices 70 and 71 will be operated substantially simultaneously. Energizing circuits for the holding windings 49 will be provided extending from the conductor 52 through holding winding 49 of control device 70, contact members 70a, conductor 75, contact members 72a, contact members 73a, conductor 77, conductor 78, control resistor 79, contact members 68a of the control relay, conductor 76, contact members 71a, and holding winding 49 of the control device 71 to the conductor 53.

Operation of the control relay 68 is prevented since its operating winding 69 is substantially shunted by the circuit extending from contact members 68a through conductor 76, contact members 71a, and holding winding 49 to the trolley conductor 53, since the holding winding 49 is of relatively low impedance.

Accordingly, the "straight" operating windings 63 and 64 are energized through the circuit extending from the trolley conductor 52 through the holding winding 49, contact members 70a, conductor 75, contact members 72a, contact members 73a, conductor 77, conductor 80, operating winding 64, operating winding 63, conductor 82, contact members 68c, and disconnect switch 83 to the other trolley conductor 53.

When the current collector 60 passes the control device 72 it operates, opening contact members 72a. The energizing circuit for the holding windings 49 of the control devices are thereby interrupted and the devices return to the non-operated condition, deenergizing the frog control system.

Should, however, the vehicle approach the intersection angularly related to the main conductors as when preparing to turn in the direction of the branch conductors 54 and 55, the current collector 60 will be positioned longitudinally in advance of the current collector 61 and will, therefore, pass the control device 70 before the current collector 61 passes the control device 71. Accordingly, the control device 70 operates before the control device 71.

An energizing circuit is thereby provided for the operating winding 69 of the control relay 68 extending from the trolley conductor 52 through holding winding 49, contact members 70a, conductor 75, contact members 72a, contact members 73a, conductor 77, conductor 78, control resistor 79, operating winding 69, and disconnect switch 83 to the trolley conductor 53. The control relay 68, therefore, operates since the shunt circuit through contact members 68a is interrupted at contact members 71a of the control device 71. Subsequent operation of the control device cannot affect the operating sequence since contact members 68a are now open.

Accordingly, the "turn" operating windings 65 and 66 of the trolley frogs 50 and 51 are connected between the trolley conductors 52 and 53 through the circuit extending through conductor 77, the operating windings 66 and 65, conductor 84, contact members 68b, and disconnect switch 83 to the trolley conductor 53. The movable tongues 57 and 58 are thereby actuated to guide the current collectors of the vehicle from the main conductors onto the branch trolley conductors.

As the current collector 61 passes the control device 73, contact members 73a thereof are opened. This interrupts the holding circuit for the control device 70 so that the control device returns to the deenergized position deenergizing the operating winding of the control relay 68 and the "turn" operating windings of the trolley frogs, thus restoring the control system to the deenergized condition.

From the above description and the accompanying drawing, it will be apparent that I have provided a simple and effective control system for trolley frogs which does not require engagement of the current collectors or any part of the moving vehicle with stationary control apparatus such as contact members or the like. Accordingly, the difficulties of maintaining suitable contact between the current collectors and such devices are obviated, and a more reliable system is provided since dirt and oxidation do not appreciably affect the magnetic flux paths of control devices embodying my invention.

Since certain changes may be made in the above described construction and different embodiments of the invention may be made without departing from the spirit and scope thereof, it is intended that all the matter contained in the above description and shown in the accompanying drawing shall be considered as illustrative and not in a limiting sense.

I claim as my invention:

1. A control system for a trolley frog at an intersection between main and branch trolley conductors comprising, circuit means including relay means having an open magnetic core structure mounted above the main conductor with an air gap therein adjacent the conductor and operable in response to reduction of the reluctance of the air gap for selectively controlling the operation of the trolley frog to guide the current collector of a vehicle either along the main conductor or onto the branch conductor, and magnetic means on the current collector effective to reduce the reluctance of said air gap for magnetically controlling the relay to determine the position of the trolley frog.

2. A control system for a pair of trolley frogs connecting pairs of main and branch conductors in a trolley conductor system comprising, circuit means selectively controlling the operation of the trolley frogs including relay means having armatures for controlling the circuit means actuated by magnetic flux from magnetic core members positioned adjacent and above the conductors so as to be clear of a dewired current collector, and means on the current collectors of an electrically operated vehicle disposed in predetermined spaced relation with the core members for controlling the flux linkages between the armatures and core members.

3. A control system for a pair of trolley frogs at an intersection of a pair of main conductors and a pair of branch conductors comprising, control means including a pair of relays having movable armature members positioned above the conductors for controlling the operation of the trolley frogs dependent on the order of operation of the armature members and core members of magnetic material including flux producing means for actuating the armatures positioned in spaced relation with one end adjacent the armatures and the others adjacent the trolley conductors, and means on the current collectors of an electrically operated vehicle including a portion of magnetic material disposed to provide a magnetic bridge between the core members for controlling the reluctance of the path therebetween and operating the armatures in accordance with the relative longitudinal positioning of the current collectors.

4. A control system for a pair of trolley frogs at the intersection of a pair of main conductors and a pair of branch conductors each having operating windings for operating the frogs to direct a pair of current collectors on an electrically operated vehicle along the main conductors or onto the branch conductors, relay means operable to selectively determine the operation of the trolley frogs, circuit means including a magnetically operated control device of no greater width than a current collector located adjacent and above each main conductor for selectively controlling the operation of the relay means, and means positioned on the current collectors of the vehicle in predetermined spaced relation with said magnetically operated device for selectively operating said devices dependent on the relative longitudinal positioning of the current collectors as they pass said devices.

5. A control system for a pair of trolley frogs at the intersection of a pair of main conductors and a pair of branch conductors, said frogs having opposed operating windings for operating the frogs to guide the current collectors of an electrically operated vehicle either along the main conductors or onto the branch conductors comprising, a control relay operable to selectively energize the operating windings of the frogs to determine the path of the current collectors, circuit means for selectively controlling the operation of the control relay including a magnetically operated control device positioned adjacent each of the main conductors in advance of the intersection having an armature with contact members for controlling the energization of the control relay, a control element comprising a portion of magnetic material on each of the current collectors disposed to be positioned in predetermined spaced relation with the associated control device for controlling the magnetic flux thereof to effect operation of the armatures, means operable to retain the control devices in the operated position after an operation, and an additional control device adjacent one of the branch conductors and one of the main conductors on the trailing side of the intersection for effecting release of said control devices from the operated position.

6. A control system for a pair of trolley frogs positioned at the intersections between a pair of main trolley conductors and a pair of branch trolley conductors and provided with a pair of operating windings for operating the frogs to guide the current collectors of a vehicle either along the main conductor or onto the branch conductor comprising, a control relay operable to effect energization of one or the other of the operating windings, a magnetically actuated control device positioned adjacent each main conductor having a core structure including permanent magnet members with a movable armature at one end and an air gap therebetween adjacent the conductor at the other, said armature having contact members operatively connected therewith for effecting energization of one or the other of the operating windings of the trolley frogs depending on the position of the control relay, and magnetic shunt means positioned on the current collectors of a vehicle disposed to pass in spaced relation to the permanent magnet members to reduce the effective air gap between them and effect operation of the armatures, said control devices being positioned in substantially opposed relation so that one of them is operated prior to the other or they are operated substantially simultaneously depending on whether or not the current collectors are longitudinally displaced relative to each other, circuit means for retaining the control devices in the operated position, and additional control devices positioned adjacent the main and branch conductors on the trailing side of the intersection for interrupting said circuit means and releasing the control devices from the operated position.

7. In a control system for effecting operation of a trolley conductor device in response to passage of a current collector along the trolley conductor comprising, a control device mounted on and positioned above the conductor having a magnetic circuit including a pair of core members of magnetic material positioned in spaced relation with one end thereof adjacent the conductor and an armature pivotally mounted for movement relative to the other ends of the core members, a magnetic member on the current collector cooperative with the core members to decrease the reluctance of the magnetic circuit for effecting operation of the armature, and circuit means including contact members actuated by the armature for controlling the operation of the trolley conductor device.

CHARLES C. WHITTAKER.

REFERENCES CITED

The following references are of record in the file of this patent:

UNITED STATES PATENTS

| Number | Name | Date |
|---|---|---|
| 1,390,067 | Varley | Sept. 6, 1921 |
| 1,624,011 | Ruddick | Apr. 18, 1927 |
| 1,797,864 | Harlandt | Mar. 24, 1931 |
| 2,157,859 | Moses | May 9, 1939 |
| 2,231,105 | Block et al. | Feb. 11, 1941 |
| 2,292,820 | Brown | Aug. 11, 1942 |
| 2,303,506 | Scott | Dec. 1, 1942 |
| 2,337,827 | Lewis | Dec. 28, 1943 |

FOREIGN PATENTS

| Number | Country | Date |
|---|---|---|
| 280,832 | Germany | Dec. 24, 1913 |